United States Patent [19]

Shoichiro et al.

[11] 3,900,341

[45] Aug. 19, 1975

[54] STORAGE BATTERY AND PROCESS FOR PRODUCING THE BATTERY

[75] Inventors: Ito Shoichiro; Tokuzi Ohya; Shozi Nagai, all of Takatsuki, Japan

[73] Assignee: Yuasa Battery Company Limited, Japan

[22] Filed: June 21, 1973

[21] Appl. No.: 372,039

[30] Foreign Application Priority Data

July 12, 1973 Japan............................ 82774/47

[52] U.S. Cl. .................... 136/54; 136/63; 136/147; 136/148; 136/176
[51] Int. Cl.² .................... H01M 4/73; H01M 2/18
[58] Field of Search ........ 136/147, 54, 63, 148, 176

[56] References Cited
UNITED STATES PATENTS

| | | | |
|---|---|---|---|
| 2,157,629 | 5/1939 | Rolph | 136/147 |
| 2,504,608 | 4/1950 | White | 136/148 X |
| 2,866,841 | 12/1958 | Zahn | 136/147 |
| 2,882,331 | 4/1959 | Zenczak | 136/148 X |
| 2,934,585 | 4/1960 | Zahn | 136/147 |
| 3,251,723 | 5/1966 | McAlpine et al. | 136/176 X |
| 3,272,657 | 9/1966 | Zenczak | 136/148 |
| 3,442,717 | 5/1969 | Horn et al. | 136/147 X |

FOREIGN PATENTS OR APPLICATIONS 45-10171   4/1970   Japan................................ 136/148

*Primary Examiner*—Allen B. Curtis
*Assistant Examiner*—Thomas A. Waltz
*Attorney, Agent, or Firm*—Watson, Cole, Grindle & Watson

[57] ABSTRACT

This invention relates to storage batteries and more particulary to a lead-acid type storage battery and a process for producing the same. The battery is a lead-acid type storage battery which is made by housing a battery plate with an envelope type separator formed by folding a microporous sheet obtained by depositing a solution consisting of a synthetic resin, a solvent dissolving the synthetic resin and a nonsolvent not dissolving it on a base, drying it and heat-sealing the sheet on the sides. The process for producing it is adapted to the mass-production. Therefore, the present invention has the advantages of obtaining a storage battery favorable in the performance, long in the life and having structure capable of being produced by automation and a process for producing the same.

5 Claims, 10 Drawing Figures

PATENTED AUG 19 1975

3,900,341

STORAGE BATTERY AND PROCESS FOR PRODUCING THE BATTERY

BACKGROUND OF THE INVENTION

This invention relates to storage batteries and more particularly to a lead-acid type storage battery and a process for producing the same.

A storage battery in which a negative plate or positive plate is housed with an envelope type separator is already well known. However, since no favorable envelope type separator could previously be prepared, the gas generated from the negative plate would stay in the clearance between the separator and the plate, the diffusion of the electrolyte was reduced and the active material escaping out of the plate during the use would accumulate in the lower part of the above mentioned envelope to break the envelope and to short-circuit the negative and positive plates. As a result, there has been a defect which had a bad influence on the performance and life of the battery. Further, there was also the problem of having to house the negative or positive plate in the envelope type separator by hand which prevented the battery from being mass produced.

SUMMARY OF THE INVENTION

The present invention is to eliminate all the above mentioned defects.

The first object of the present invention is to provide a storage battery which is favorable in the performance and long in the life and a process for producing the same.

The second object of the present invention is to provide a storage battery adapted for mass-production and a process for producing the same.

The present invention will be able to be easily understood from the following description with reference to the drawings.

DESCRIPTION OF THE PREFERRED EMBODIMENTS

Figure 1:
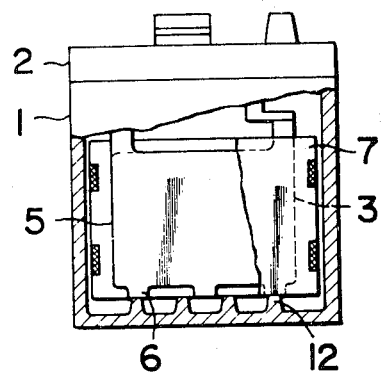
FIG. 1 is a partly sectional vertical side view of a storage battery of the present invention.
Figure 2:
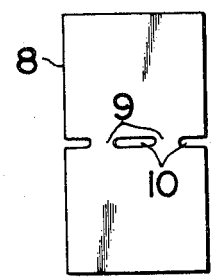
FIG. 2 is a plan view of a microporous sheet slitted before forming an envelope type separator.
Figure 3:
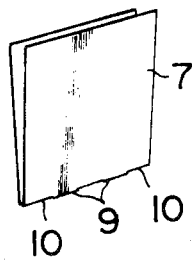
FIG. 3 is a perspective view of the microporous sheet in FIG. 2 as folded.

In FIGS. 1 to 6 showing an embodiment of the present invention, 1 is a container for a storage battery, 2 is a lid, 3 is a battery plate having a lug 4 such as a positive plate or negative plate, 5 is an active material of the plate, 6 is a leg of the plate and 7 is an envelope type separator which is formed of a special soft microporous sheet and shall be described later. Element 9 is a protective part for the plate leg 6 provided in the bottom of the envelope type separator 7, 10 is a slit made in the bottom of the envelope type separator so as to drop the active material 5 into the bottom of the container, 11 is a heat-sealing part to make the folded microporous sheet 8 an envelope type separator and 12 is a saddle provided in the bottom of the container.

One of the most important features of the present invention is to apply the already described envelope type separators each made of a special microporous sheet to a storage battery. This special microporous sheet is made by depositing a uniform solution having as main components a synthetic resin, a solvent dissolving the synthetic resin and non-solvent not dissolving it on a base such as a porous body and drying it. It is made, for example, by depositing a solution prepared by dissolving seven parts of a heat-proof polyvinyl chloride resin in 63 parts of tetrahydrofuran and adding 30 parts of ethyl alcohol to the solution on a base of a polyester non-woven fabric of a thickness of 0.08 mm. or a polypropylene non-woven fabric of a thickness of 0.15 mm. and drying it. An envelope type separator made of the thus obtained thin microporous sheet of a thickness of 0.1 to 0.2 mm. is adapted to house a plate of a storage battery.

The first of its characteristics is that the electrical resistance is very low. The electric resistance of the envelope type separator of a thickness of 0.1 mm. according to the present invention is 0.0002 to 0.0006 $\Omega/cm^2$./sheet and is much lower than the electric resistance of 0.0012 to 0.003 $\Omega/cm^2$./sheet of a conventional separator such as a rubber separator. The use of such a separator has an advantage of obtaining a high performance storage battery which is in its discharge characteristic such as, for example, a starting output (cranking ability) at a low temperature in a cold district.

The second of the characteristics is its microporosity. There are several 10,000 to several 100,000,000 micropores per $cm^2$. in the envelope type separator of the present invention and their diameter is several 100 A to several $\mu$ and is 1/10 to 1/100 the diameter of the pores in the conventional separator. As well known, the plate grid of a storage battery for automobiles is made of an antimony-lead alloy and, while the battery is being used, the antimony of the cathode plate will move to the surface of the negative plate and will be deposited so to reduce the hydrogen overvoltage of the negative plate. As a result, the current in the final period of the charge becomes so large as to cause an overcharge, thereby causing the electrolyte to decrease early, the self-discharge to increase and the life to become short. The envelope type separator of the present invention is so much smaller in the pore diameter than the conventional separator and has a higher ability to prevent the permeation of antimony that there is an advantage of reducing the damage caused by antimony.

The third of the characteristics is that the envelope type separator of the present invention is high in the acid-proofness and oxidation proofness. For example, a conventional fiber-reinforced separator of a thickness of 0.7 to 0.8 mm. is usually pasted with a glass mat of a thickness of 0.4 to 0.5 mm. and its oxidationproofness is 50 to 70 hours/sheet. On the other hand, in utilizing the envelope type separator of the present invention which as already described is a microporous sheet of a thickness of 0.1 to 0.2 mm. pasted with a glass mat of 0.4 to 0.5 mm. its oxidation-proofness will be 100 to 120 hours/sheet.

The fourth of the characteristics is that the envelope type separator of the present invention is so thin as to be 0.1 to 0.2 mm. thick. As a result, there is an advantage that a battery of a high performance is obtained by being able to contain an increase number of plates in a container of a fixed capacity.

Another important feature of the present invention is to utilize in a storage battery, envelope type separators each made by folding a microporous sheet and heat-sealing it on the sides so as to house a battery plate such as a negative plate or a positive plate. This procedure is clearly shown in FIGS. 3 and 4. Slits 10 are made in the bottom of the envelope formed by folding the microporous sheet 8 except in the protective parts 9 for the legs of the plate so that, during the use of the battery, the active material dropping from the plate may be dropped into the bottom of the container thereby providing advantages in improving the diffusion of the electrolyte and the performance of the battery. Further, the folded microporous sheet can be heat-sealed on the sides so easily that the envelope type separator to house the plate can be easily prepared and there is an advantage of obtaining a storage battery having a structure which is adapted to the mass-production.

Figure 4:
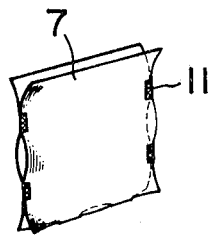
FIG. 4 is a perspective view of an envelope type separator formed by heat-sealing the folded microporous sheet on the sides.
Figure 5:
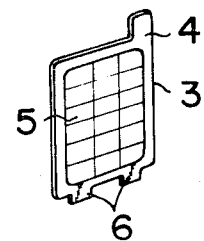
FIG. 5 is a perspective view of a storage battery plate such as a positive plate or a negative plate.
Figure 6:
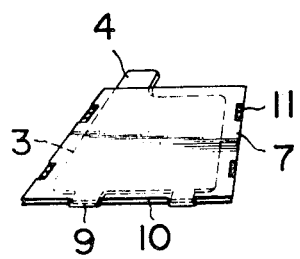
FIG. 6 is a perspective view of the battery plate as housed within the envelope type separator.
Figure 7:
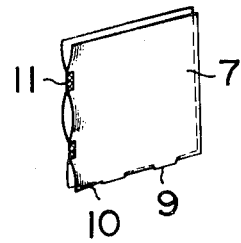
FIG. 7 is a perspective view of a modification of the envelope type separator.

As shown in FIG. 4, the folded sheet has heat-sealed sections 11 in two upper and lower parts on each side. In FIG. 7 which shows another modification, the folded sheet is not heat-sealed but is open on one side so that there may be an advantage of inserting the plate more easily.

Figure 8:
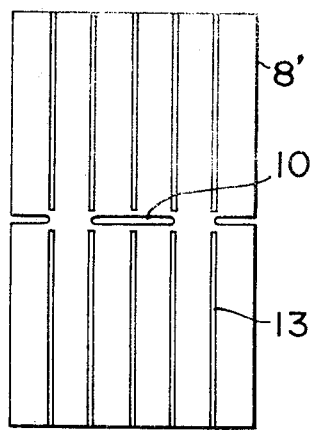
FIG. 8 is a plan view of the microporous sheet before forming another modification of the envelope type separator.

In FIG. 8 which shows another modification, the microporous sheet 8' has ribs 13 so that the envelope type separator made of this microporous sheet may have ribs on the inside surface to keep the clearance between the separator and plate. This provides the advantages of enabling the gas generated during the use of the battery to quickly escape out and of improving the diffusion of the electrolyte. It is needless to say that a glass mat, non-woven fabric or synthetic resin net may be used instead of the ribs as a clearance keeping means.

Figure 9:
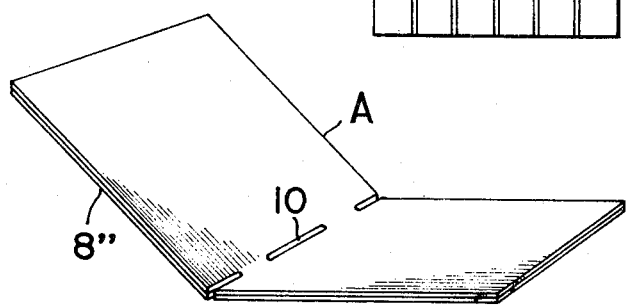
FIG. 9 is a perspective view of the microporous sheet before forming still another modification of the envelope type separator.

In FIG. 9 which shows another modification, the microporous sheet 8'' has a porous plate A used together with it. As already described, the microporous sheet of a thickness of 0.1 to 0.2 mm. is so thin and soft that, in case it is desired to have any rigidity, it should be formed integrally with a porous plate made of a synthetic resin by heat-sealing or using a binder. As a result, it becomes possible to prepare an envelope type separator having a rigidity adapted to the automation of the assembly of plates. The rigidity may be kept also by pasting a glass mat containing advantageously more than 30% of a binder such as acryl or styrene to the microporous sheet.

Figure 10:
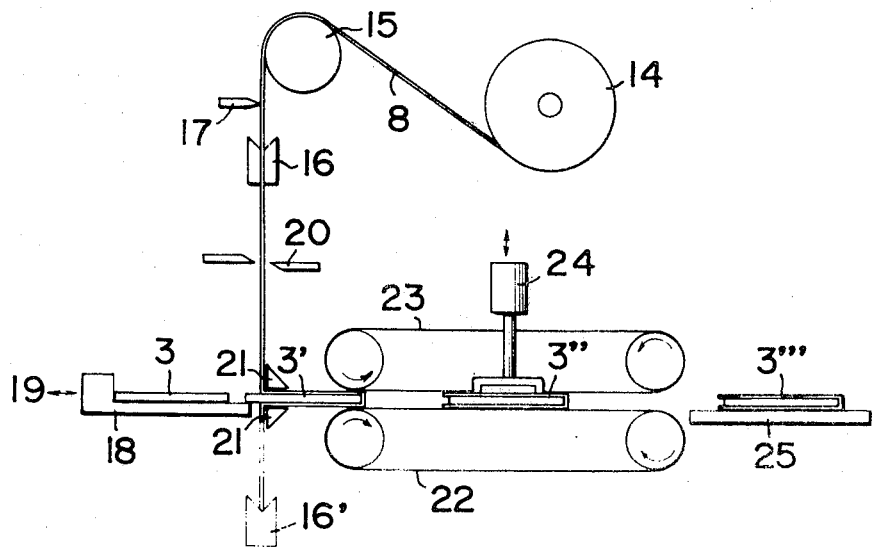
FIG. 10 is a diagram showing a process for making envelope type separators each housing a battery plate.

FIG. 10 shows a diagram of a process for making envelope type separators each housing a plate. As shown, a microporous sheet 8 is unwound from a reel 14 and lowered vertically from above due to a downward pulling action by a claw 16 through a guide roll 15 to a position indicated by claw 16'. A slit cutter 17 is provided in a proper position so that a slit 10 of any desired shape may be formed horizontally in the microporous sheet 8 stopping once during the fall. On the other hand, a guide plate 18 mounting a plate 3 is provided on the left side of the microporous sheet so as to be moved horizontally from left to right with a pusher 19. Thus the plate 3 mounted on the horizontally moving guide plate contacts the vertically lowering microporous sheet 8. In such case, the legs 6 of the plate 3 are adjusted so as to contact the protective parts 9 of the microporous sheet 8. Then, at the same time as the plate further moves somewhat rightward, the microporous sheet will be cut off above with a cutter 20 and will separate below from claw 16'. When the plate 3 moves further rightward, it will be enclosed with the folded microporous sheet 8 with a pair of guides 21 as shown by 3' in the drawing. The plate 3' is further conveyed rightward with a pair of upper and lower conveyers 23 and 22. When it reaches the middle of the above mentioned conveyers, a heat-sealer 24 will lower to heat-seal the microporous sheet enclosing the plate on the sides as shown by 3'' in the drawing. Then, the heat-sealer 24 rises, the plate 3'' is further conveyed rightward and passes through between the above mentioned conveyers and then an envelope type separator housing the plate within is placed on a carriage 25 as shown by 3''' in the drawing. If the plate housed in the envelope type separator is, for example, a positive plate, a negative plate is placed on it and a required number of them as alternately piled up are contained in the container and are assembled into a battery by a known technique. The claw 16' having separated from the microporous sheet in the already described process moves again upward, grips the end of the microporous sheet 8 cut off with the cutter 20 and pulls down the microporous sheet. Then the already described process is repeated. It is needless to say that the respective operations in the already described process are carried out automatically and mechanically as correlated with one another.

Needless to say, it is possible to make various modifications and alter the producing process without deviating from the spirit of the present invention. For example, in the process of completing the envelope type separator housing the battery plate, instead of making slits in the microporous sheet with the slit cutter in advance, the slits may be made after the battery plate is enclosed with the folded microporous sheet or after the microporous sheet is heat-sealed.

What is claimed is:

1. A lead-acid type storage battery comprising: micro-pores
    an envelope type separator formed by a folded micro-porous sheet made of a synthetic resin having between several 10,000 to several 100,000,000 micro-pores per $cm^2$, with the diameter of such mirco-pores being in a range between 100 A to several $\mu$, and said folded micro-porous sheet having portions of at least one of its sides heat-sealed together and having slits in its folded section; and,
    a battery plate housed within said envelope type separator, said battery plate having at least one leg; said slits within said micro-porous sheet being arranged so as to leave a sufficient portion of the folded section of said sheet for forming a protective cover for said leg of said battery plate; and said slits being arranged to enable active material generated during battery operation to drop from said battery plate without accumulating at the bottom of said separator.

2. A lead-acid type storage battery as defined in claim 1, wherein said folded micro-porous sheet is heat-sealed at both upper and lower parts along its two sides adjacent the folded section.

3. A lead-acid type storage battery as defined in claim 1, wherein said folded micro-porous sheet has a thickness of between 0.1 and 0.2 mm and clearance maintaining means provided on its inner surface.

4. A process for forming an envelope type separator enclosing a battery plate for use in a lead-acid type storage battery comprising the steps of:

gripping a lower edge of a micro-porous sheet extending from a reel of such sheet;

vertically lowering the micro-porous sheet;

forming horizontal slits in the micro-porous sheet when in its vertical orientation, the slits being formed except in those locations corresponding to the location of legs of a corresponding battery plate and the slits being formed to enable active material generated during battery operation to drop from the battery plate without accumulating at the bottom of the separator;

horizontally moving a battery plate having at least one leg into contact with the vertically orientated sheet at such slitted section;

arranging the battery plate legs adjacent to sections of the micro-porous sheet free of any slit;

cutting off the micro-porous sheet from the reel and releasing the grip on the lower edge of the sheet;

enclosing the battery plate by folding the micro-porous sheet; and, forming an envelope type separator by heat-sealing the sides of the micro-porous sheet.

5. A process as defined in claim 4, wherein said step of enclosing the battery plate is carried out by moving the battery plate and the micro-porous sheet between upper and lower conveyers and said step of heat-sealing occurs while the battery plate and micro-porous sheet move between the conveyers.

* * * * *